United States Patent [19]

Sato

[11] 4,300,713
[45] Nov. 17, 1981

[54] CASSETTE TAPE RECORDER

[75] Inventor: Masaaki Sato, Hachioji, Japan

[73] Assignee: Olympus Optical Co., Ltd., Tokyo, Japan

[21] Appl. No.: 95,325

[22] Filed: Nov. 19, 1979

[30] Foreign Application Priority Data

Nov. 21, 1978 [JP] Japan ................................. 53-143927

[51] Int. Cl.³ ............................................ B65H 17/20
[52] U.S. Cl. ................................ 226/190; 242/209
[58] Field of Search ................. 226/190, 194; 29/407; 242/197–200, 55, 19 A, 208–210; 360/96, 132

[56] References Cited

U.S. PATENT DOCUMENTS

| 3,684,295 | 8/1972 | Strain et al. | 242/198 X |
| 3,870,247 | 3/1975 | Carisey | 242/198 |
| 4,006,522 | 2/1977 | Dattilo | 29/407 |

*Primary Examiner*—Leonard D. Christian
*Attorney, Agent, or Firm*—Toren, McGeady & Stanger

[57] ABSTRACT

A small sized cassette tape recorder has a capstan shaft cooperating with a pinch roller to feed a tape in a tape cassette charged in the recorder. The upper end portion of the capstan shaft is supported by a bearing which is mounted on the cover, when the cover is closed. Thus, the capstan shaft is supported at both its ends and not cantilevered.

5 Claims, 8 Drawing Figures

CASSETTE TAPE RECORDER

BACKGROUND OF THE INVENTION

The present invention relates to a cassette tape recorder including a cassette chamber to enclose a tape cassette, a movable cover of the cassette chamber and a capstan shaft which cooperates with a pinch roller to drive a tape in the tape cassette.

Recently, such cassette tape recorders tend to be miniaturised and also to be thinner.

In conventional cassette tape recorders, the capstan shaft is supported by one bearing which is mounted under the cassette chamber. The bearing supports the capstan shaft at a lower end portion thereof. As lateral force is applied by the pinch roller to the cantilever supported capstan shaft, the axial length of the bearing is relatively long. To manufacture a thin cassette tape recorder, the axial length of the bearing is shortened. Consequently, the lateral force applied by the pinch roller to the capstan shaft tends to damage the short length bearing.

SUMMARY OF THE INVENTION

An object of the present invention is to eliminate the above described disadvantages of the conventional cassette tape recorder.

Another object of the present invention is to provide a cassette tape recorder which has a bearing with large mechanical strength by providing bearings at upper and lower portions of the capstan shaft, respectively, and which can be thinner than the conventional thin cassette tape recorder.

To attain the object, a cassette tape recorder of the above mentioned type, comprises a bearing mounted on the cover and supporting the upper end portion of the capstan shaft when the cover is closed.

By supporting the capstan shaft by upper and lower bearings, lateral force applied by the pinch roller to the capstan shaft is not received by a conventional cantilever supported capstan shaft and is received instead by a capstan shaft which is supported by two bearings. Thus, axial lengths of the bearings can be substantially decreased, and the thickness of the cassette tape recorder can be decreased.

The above mentioned cassette tape recorder, according to the present invention may further comprises a detent element responsive to the opened or closed state of the cover, and means mounted on the detent element and retaining said pinch roller from moving against the capstan shaft when the cover is not closed.

As the pinch roller is not moved to the cantilevered capstan shaft when the cover is opened, the pinch roller does not apply lateral force accidentally when the start button is erroneously operated.

According to another feature of the present invention, when the cover is pivotably supported to the tape recorder, the bearing mounted on the cover may be shaped as a half cut shape or semicircular member, or have an elongated opening to support the capstan shaft.

Thus, interference between the bearing surface and the capstan shaft caused by relative inclination while opening or closing the cover can be effectively eliminated.

The invention will further be described with reference to the accompanying drawings.

BRIEF DESCRIPTION OF THE DRAWINGS

FIG. 2b shows close state of the cover in FIG. 2a;

DESCRIPTION OF THE PREFERRED EMBODIMENT

Figure 1:
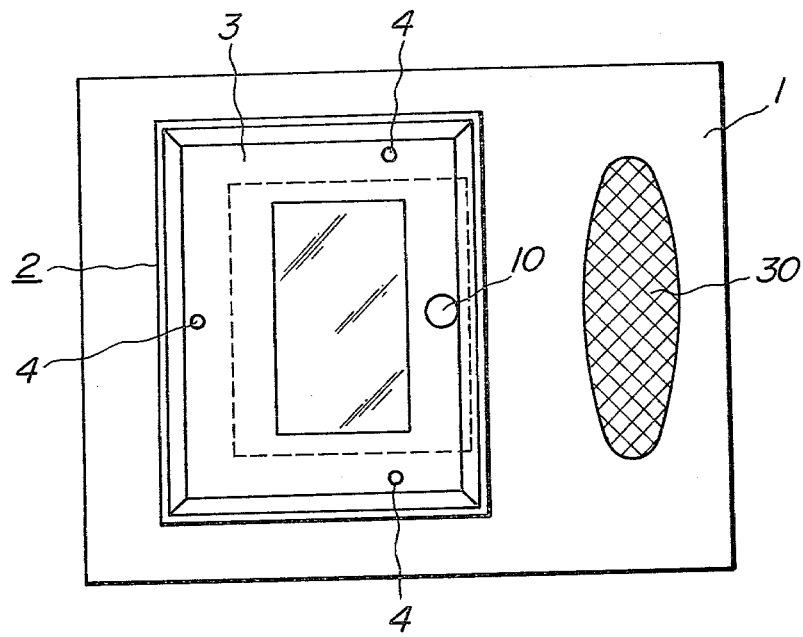
FIG. 1 is a plan view of a cassette tape recorder, according to the present invention.
Figure 2A:
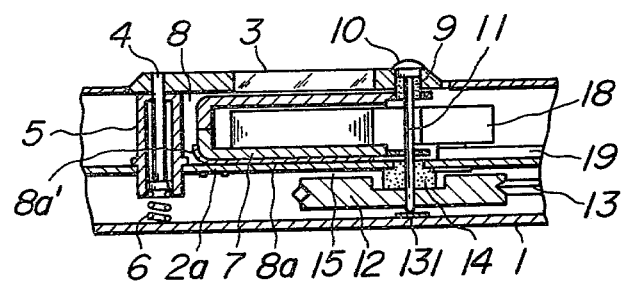
FIG. 2a is a sectional view along line A—A of FIG. 1 and shows open state of a cover.
Figure 2B:
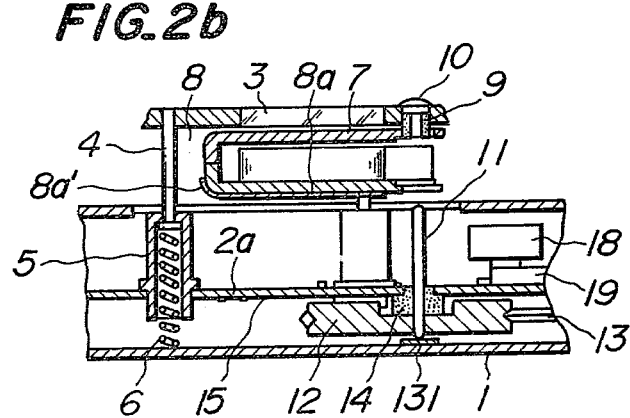

Referring to FIGS. 1, 2a and 2b, reference numeral 1 designates a tape recorder body which has a cassette chamber 2 to charge a tape cassette 7, and an opening 30 for a speaker, not shown. The cassette chamber 2 is closed by a cover 3 which is opened when the cassette 7 is charged or discharged.

The cover 3 has a plurality of vertical guide pins 4, and in the embodiment shown in the drawings, three guide pins 4 are secured with the cover 3. Each guide pin 4 is passed in a guide tube 5 which is in the cassette chamber 2, to move the cover 3 vertically as shown in FIGS. 2a and 2b. The cover 3 is urged to open direction by a spring 6 which is inserted in each guide tube 5. To close the cover 3, the cover 3 is manually pressed down against the springs 6 and is clamped by a clamp, not shown, to maintain the closed position.

The cover 3 has a holder portion 8 which holds the tape cassette 7. The holder portion 8 has a lower plate 8a which has an upward bent portion 8a'. When a lower edge of the tape cassette 7 is engaged with the upward bent portion 8a', the tape cassette 7 is held and positioned in the holder portion 8, as shown in FIGS. 2a and 2b.

The cover 3 has a bearing 9 and a cap 10 thereof. As shown in FIG. 2a, the bearing 9 rotatably supports a top end portion of a capstan shaft 11, when the cover 3 is in closed position.

The capstan shaft 11 passes through a bottom chassis 2a of the cassette chamber 2. The capstan shaft 11 is driven through a flywheel 12 and a belt 13 by a motor, not shown. The capstan shaft 11 is rotatably supported by a bearing 14 which is mounted to the bottom chassis 2a. Thus, the capstan shaft 11 is supported at upper and lower portions by the bearings 9 and 14 when the cover 3 is closed as shown in FIG. 2a. Thrust force of the capstan shaft 11 is received by a thrust bearing 131 at bottom end.

Figure 3:
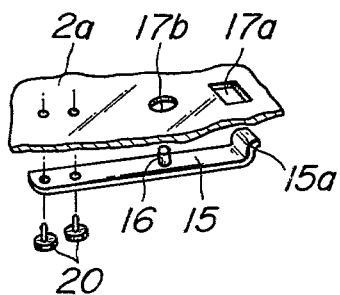
FIG. 3 is a perspective and expanded view of a portion of FIG. 2b and shows a detect element.

A detent element 15 is mounted on the rear surface of the bottom chassis 2a to detect whether the cover 3 is opened or closed. The detent element 15 is a slender plate spring as shown in FIG. 3 and forms a L-shaped upward bent portion 15a at the free end thereof. A pin 16 is mounted on the center portion of the detent element 15. The other end of the detent element 15 is mounted on the rear surface of the bottom chassis 2a by rivets 20, to project the upward bent portion 15a and the pin 16 upwards through openings 17a and 17b of the bottom chassis 2a respectively. When the cover 3 is closed, the lower plate 8a of the holder portion 8 urges the pin 16 downwards, so that the upward bent portion 15a of the detent element 15 is retracted downwards from the opening 17a as shown in FIG. 2a.

A pinch roller 18 is opposed with the capstan shaft 11. The pinch roller 18 is rotatably mounted on an arm 19 which is operated by an operating button, not shown, to contact the pinch roller 18 with the capstan shaft 11 at a predetermined pressure and to retract the pinch roller 18 from the capstan shaft 11 as shown in FIGS. 2a and 2b. When the cover 3 is opened, the upward bent portion 15a of the detent element 15 is projected from the bottom chassis 2a to prevent the pinch roller 18 from contacting with the capstan shaft 11.

Operation of the tape recorder shown in FIGS. 1-3 will be described. When the cover 3 is opened as shown in FIG. 2b, the tape cassette 7 can be charged into or discharged from the holder portion 8. The tape cassette 7 is positioned accurately by contacting the lower edge thereof with the upward bent portion 8a' of the lower plate 8, when the tape cassette 7 is charged.

When the cover 3 is opened the upward bent portion 15a and the pin 16 of the detent element 15 are projected upward through the openings 17a and 17b of the bottom chassis 2a of the cassette chamber 2. The upward bent portion 15a engages with the arm 19 which supports the pinch roller 18 to prevent the arm 19 from moving. Thus, if the operating button is pressed accidentally, the arm can not move to urge the pinch roller 18 against the capstan shaft 11 which is now supported only by the lower bearing 14 as shown in FIG. 2b. Consequently, the cantilevered capstan shaft 11 is free from any lateral force which may damage the bearing 14.

After the tape cassette 7 is charged, the cover 3 is pressed downwards. As the cover 3 lowers, the guide pins 4 move downwards in the guide tubes 5 against the springs 6 respectively. After the cover 3 is closed as shown in FIG. 2a, the cover 3 is clamped by a clamp device not shown.

As the cover 3 moves downwards, the capstan shaft 11 passes through a capstan opening of the tape cassette 7 and is inserted into the bearing 9 which is mounted on the cover 3. Thus, when the cover 3 is closed, the capstan shaft 11 is supported by the bearings 9 and 14 at upper and lower end portions thereof.

When the cover 3 is closed the pin 16 of the detent element 15 is urged downwards by the lower plate 8a of the holder portion 8 to retract the upward bent portion 15a from the opening 17a of the lower plate 8a and from engagement with the arm 19. Thus, by operating the operating button, not shown, the arm 19 urges the pinch roller 18 against the capstan shaft 11 at a predetermined force, as the arm 19 is not restrained by the upward bent portion 15a of the detent element 15.

It will be appreciated that, by supporting the capstan shaft 11 at upper and lower portions by the bearings 9 and 14, according to the present invention, the urging force of the pinch roller 18 can be very easily received by the thin bearings 9 and 14 without causing excessive bending force to the capstan shaft 11. As the bearing 9 is mounted on the cover 3, the thickness of the tape recorder can be substantially decreased. Also, when the cover 3 of the cassette chamber is opened and the capstan shaft 11 is supported only by the lower bearing 14, the arm 19 of the pinch roller 18 is restrained at the retracted position to prevent the roller 18 from being accidentally urged against the capstan shaft 11. Thus, the bearing 14 is not damaged by lateral force.

Figure 4:
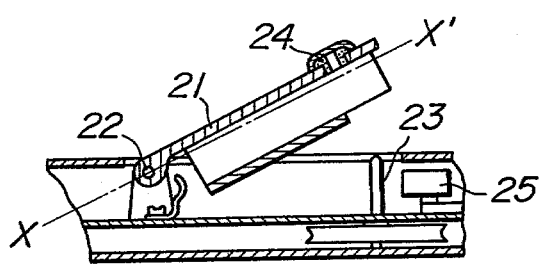
FIG. 4 is a sectional view similar to FIG. 2b and shows a second embodiment of the invention.

Many variations can be made without departing from the basic scope of the present invention. For example, FIG. 4 shows a cover 21 of the kangaroo type which snaps open about a pivot pin 22. A bearing 24 mounted on the cover 21 and supporting the upper end portion of a capstan shaft 23 may be made as a half cut shaped or semicircular bearing shown in FIG. 5, since the lateral force of a pinch roller 25 acts only in one direction. The bearing mounted on the pivotable cover 21 may be a bearing 26 having an elongated opening shown in FIG. 6. The lower end surface of the bearing 24 or 26 may be higher than line X-X' shown in FIG. 5. The line X-X' is a line perpendicular to the capstan shaft 23 and passes the center of the pivot shaft when the cover 21 is closed. Thus, interference between the inner surface of the bearing 24 or 26 and the outer surface of the capstan shaft 23 is prevented during closing of the cover 21.

Figure 5:
FIGS. 5 and 6 show enlarged perspective views of two variations of the bearing shown in FIG. 4.
Figure 6:
Figure 7:
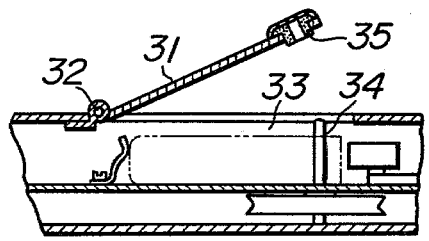
FIG. 7 is a sectional view similar to FIG. 4 and shows a third embodiment of the invention.

FIG. 7 shows a cover 31 which opens a cassette chamber 33 by moving about a pivot pin 32. The cover 31 includes a bearing 35 which supports a capstan shaft 34 as before. In the embodiment shown in FIG. 7, a line which is perpendicular to the capstan shaft 34 and passes the center of the pivot shaft 32 when the cover 31 is closed, passes at about the center of the thickness of the bearing 35. As the distance between the pivot shaft 32 and the bearing 34 is much longer than the axial dimension of the bearing 34, the clearance between the shaft 34 and the bearing 35 can effectively avoid interference between the shaft 34 and the bearing 35 while the cover 31 is inclined to the capstan shaft 34 in the opening and closing process. The bearing 35 may be made as half cut shaped or with an elongated opening as shown in FIGS. 5 and 6.

It will be appreciated that by supporting the upper and lower end portions of the capstan shaft of the tape recorder by the upper and lower bearings, according to the present invention, lateral force applied to the capstan shaft can be easily supported by thin bearings so that the tape recorder also can be thinner than known tape recorders.

What is claimed is:

1. A cassette tape recorder comprising: a cassette chamber adapted to receive therein a tape cassette; a cover movably mounted on said recorder to open and close said cassette chamber; a capstan shaft having a pair of ends and adapted to extend through a tape cassette placed in said cassette chamber in operative engagement therewith; a pinch roller operable in cooperation with said capstan shaft to drive the tape of a tape cassette placed in said cassette chamber; first bearing means in said recorder operatively supporting said capstan shaft at one end thereof; and second bearing means mounted in said movable cover and adapted to be placed into and out of engagement with the other end of said capstan shaft as said cover is closed and opened, respectively, said second bearing means operating to support said capstan shaft at said other end thereof when said cover is closed.

2. A recorder according to claim 1 wherein said pinch roller is operable by being moved into and out of operative engagement with said capstan shaft, said recorder further comprising a detent element responsive to the position of said cover with means mounted on said detent element to restrain said pinch roller from moving toward said capstan shaft when said cover is not closed.

3. A recorder according to claim 1 or 2 wherein said cover is mounted on said recorder to be pivotally movable between the opened and the closed positions thereof, and wherein said second bearing means mounted on said cover is formed with a semicircular configuration.

4. A recorder according to claim 1 or 2 wherein said cover is mounted on said recorder to be pivotally movable between an opened and a closed position thereof, and wherein said second bearing means mounted on said cover is formed with an elongated opening within which said other end of said capstan shaft is supported, said elongated opening operating to enable said other end of said capstan shaft to be moved into and out of operable engagement with said second bearing means as said cover is closed and opened.

5. A recorder according to claim 1 or 2 wherein said cover is mounted on said recorder for pivotal movement between the opened and closed positions thereof about a pivot shaft, said second bearing means being arranged on said cover so that a line extending perpendicular to said capstan shaft and passing through the center of said pivot shaft will extend approximately through the center of said second bearing means when said cover is closed.

* * * * *